United States Patent [19]

Kobayashi et al.

[11] Patent Number: 4,470,296

[45] Date of Patent: Sep. 11, 1984

[54] FUEL GAUGE FOR AN AUTOMOTIVE VEHICLE

[75] Inventors: Hiroshi Kobayashi, Yokohama; Toru Kita, Yokosuka, both of Japan

[73] Assignee: Nissan Motor Company, Limited, Japan

[21] Appl. No.: 456,051

[22] PCT Filed: Dec. 28, 1981

[86] PCT No.: PCT/JP81/00420

§ 371 Date: Dec. 30, 1982

§ 102(e) Date: Dec. 30, 1982

[87] PCT Pub. No.: WO83/02322

PCT Pub. Date: Jul. 7, 1983

[51] Int. Cl.³ .......................................... G01M 15/00
[52] U.S. Cl. ...................................................... 73/113
[58] Field of Search ...................... 73/113, 304 C, 313; 364/442

[56] References Cited

U.S. PATENT DOCUMENTS 4,157,038  6/1979  Yamamoto ........................ 73/313
4,402,048  8/1983  Tsuchida et al. ................. 73/113 X Primary Examiner—Jerry W. Myracle
Attorney, Agent, or Firm—Lowe, King, Price & Becker

[57] ABSTRACT

A fuel gauge is so designed that a fuel level signal having a signal value responsive to the fuel amount in a fuel tank is averaged over time intervals which vary according to whether the liquid level of the fuel in the tank is stable or unstable and a fuel quantity is calculated and displayed according to the averaged value. The stable or unstable condition of the fuel level is discriminated in accordance with vehicle speed, the "on" or "off" position of an ignition switch or the like. Accordingly, when the fuel level is unstable, the signal value is averaged over a time interval which is longer than that used when the fuel level is stable so that the response of display to variation of the fuel level is improved.

19 Claims, 6 Drawing Figures

FUEL GAUGE FOR AN AUTOMOTIVE VEHICLE

FIELD OF THE INVENTION

This invention relates to a fuel gauge for an automotive vehicle, and more particularly, a fuel gauge which is so designed that the fuel-measuring timing is varied in accordance with driving conditions of the automotive vehicle.

In conventional art, fuel gauges which measure the amount of fuel remaining in a fuel tank of a vehicle are well known. One typical conventional fuel gauge is designed so as to average a detected fuel-level signal to display the fuel amount. That is, since the fuel is apt to be agitated on account of the inertial forces applied to the fuel in the tank under certain conditions such as when the vehicle moves through a curve, the vehicle is accelerated or decelerated, or the like, it is necessary to average the detected-fuel-level signal in order to measure the actual fuel amount. Such a fuel gauge which displays the fuel amount after performing the fuel level averaging operation, is convenient for displaying the average fuel amount. However, since the response of the fuel gauge, that is, the response of display to a variety of fuel levels, is normally determined while the vehicle is moving, this may possibly cause problems in the case of increase of the fuel level in the fuel tank within a short time, such as during refueling, in that the increment of fuel is displayed with delay. On the other hand, it is desirable to display the fuel amount at once when the ignition key is turned to the accessory position in order to start the vehicle. However, if the averaging interval for the detected fuel-level signal is relative long, this may cause another problem in that the fuel level display is delayed for a while when the ignition key is turned to the accessory or ignition position.

On the other hand, as is well known, a fuel gauge including a float-type sliding resistor or a winding resistor generating an analog signal as the detected-fuel-level signal comprises a float which floats on the surface of the fuel and a brush which is adapted to slide along the resistor, and the float and the brush are assembled in a single body so that the brush is moved as the float moves in accordance with variations of fluid level. As a result, the resistance value of the sliding resistor or winding resistor varies. Thus, if a constant current is supplied to this resistor, the voltage will vary when the resistance value of the resistor varies. Accordingly, the fuel amount can be displayed by detecting the voltage variations. Since the voltage value generated by the fuel gauge varies in accordance with the variation of the fuel level owing to the vibration or shaking of vehicle while the vehicle is moving, the detected fuel level signal is averaged by an integrator so that the fluctuation of voltage while the vehicle is moving is smoothed. However, this requires an averaging time of about 1 to 2 minutes. Thus, the display may appear with a delay of about 1 to 2 minutes after the ignition key is turned to the accessory or ignition position, or after the vehicle starts from a dead stop.

With these problems in mind, it is an object of the present invention to over come these problems by switching the averaging interval of the detected-fuel-level signal in accordance with vehicle conditions; that is, the fluctuation of detected fuel-level signal is decreased by using a relative long averaging interval in the case when the vehicle is moving, and the response of the fuel-level display is improved by measuring the detected fuel-level signal with a relatively short averaging interval in cases when the vehicle is supplied with fuel or just before the engine is started.

SUMMARY OF THE INVENTION

To accomplish the above described object or other objects, a fuel gauge according to the present invention comprises means for generating a signal having a value representative of the fuel level in a fuel tank, means for calculating and displaying the fuel level in the fuel tank in accordance with the signal value, and means for discriminating vehicle driving conditions in accordance with predetermined parameters and changing the timing of the calculation and display the fuel level in accordance with the discriminated conditions. Thus, according to the fuel gauge of the present invention, the response characteristics to variation of the fuel level in the fuel tank can be improved and the measured result can be more accurate by changing the timing in accordance with vehicle driving conditions. As a result, the fuel gauge has superior reliability and improved response characteristics in comparison with conventional fuel gauges.

According to a preferred embodiment of the present invention, there is provided a fuel gauge comprising a fuel level detecting means for generating a first signal having value variable in proportion to the fuel level in the fuel tank, an averaging means for averaging the signal values over a given period of time at a predetermined timing to produce a second signal having a value representative of the averaged value, a timing control means for detecting vehicle driving conditions in response to variation of a predetermined parameter and changing the operational timing of the averaging means in accordance with the detected vehicle driving conditions, and a calculating means for calculating the fuel level in the fuel tank in accordance with the second signal and displaying the calculated value.

In addition, according to a measuring method for measuring fuel, the response characteristics, fidelity to variation of the fuel level and accuracy of measurement of the fuel level are improved by generating a first signal having a value which corresponds to the fuel level in a fuel tank, obtaining an average of fuel levels over a predetermined time period by averaging the signal value of the first signal at a predetermined frequency, generating a second signal having a value which corresponds to the average fuel level, calculating the amount of fuel in the fuel tank in accordance with the signal value of the second signal, discriminating vehicle driving conditions in accordance with a specific parameter, and varying the averaging frequency and the time interval for the first signal in accordance with the discriminated result.

BRIEF DESCRIPTION OF THE DRAWINGS

The invention will be understood more fully from the detailed description given herebelow and from the accompanying drawings of the preferred embodiment of the present invention, which, however, should not be taken as limitative to the invention but for explanation of elucidation only.

In the drawings.

DESCRIPTION OF THE PREFERRED EMBODIMENT

Figure 1:
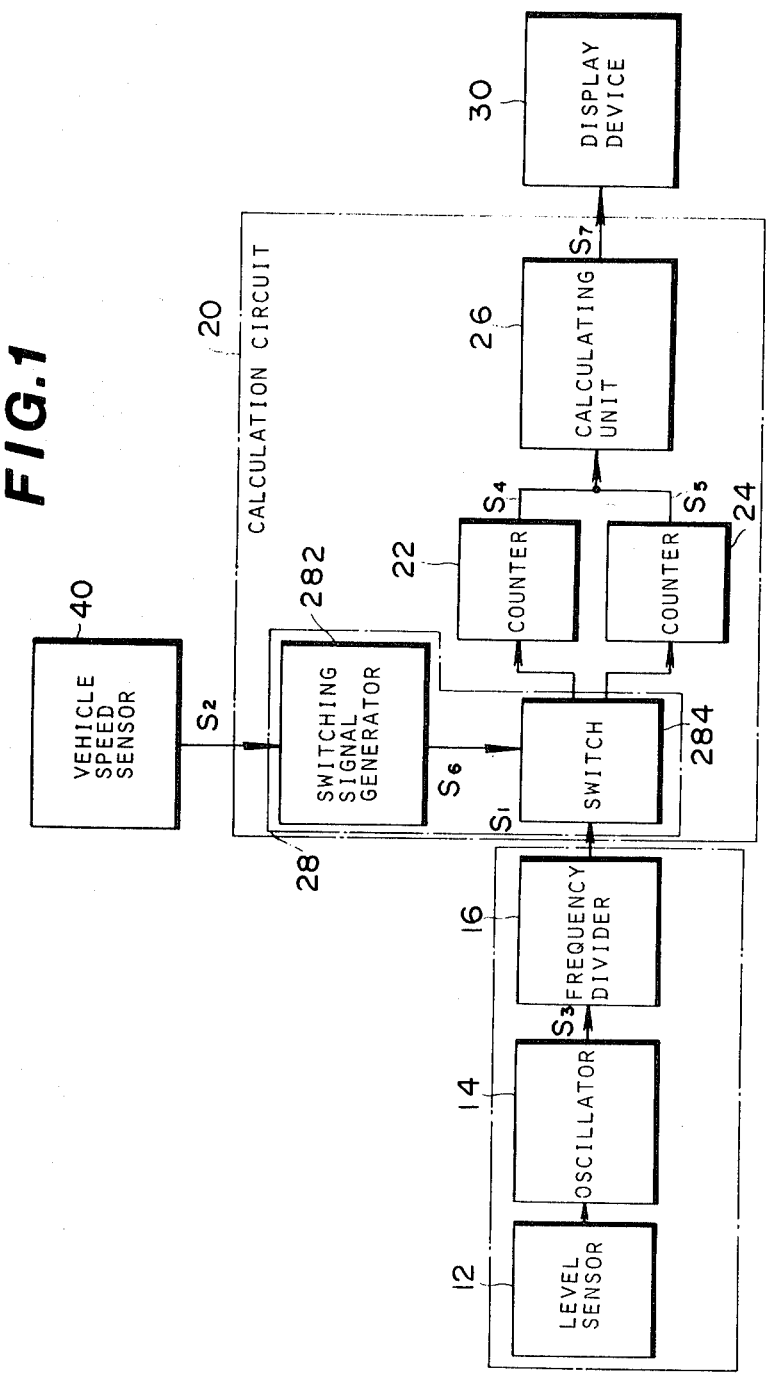
FIG. 1 is a block diagram of an embodiment of a fuel gauge according to the present invention.

FIG. 1 is a block diagram of a first embodiment of a fuel gauge according to the present invention. A fuel gauge is inserted into a fuel tank. The fuel gauge comprises a fuel level detector 10 outputting a pulse signal $S_1$ (hereinafter referred to "fuel level pulse") the frequency of which is variable in accordance with the fuel level, a calculation circuit 20 which derives the average period or frequency of the fuel level pulse $S_1$ within a predetermined time period and calculates a fuel quantity in accordance with the derived average period, and a display device 30 for displaying the fuel quantity in response to the calculated result of the calculation circuit 20. The calculation circuit 20 is futher connected to a vehicle speed sensor 40 so that the calculation circuit adjusts the predetermined time period for deriving the average frequency depending upon presence or absence a vehicle speed signal $S_2$ from the vehicle speed sensor.

Figure 2:
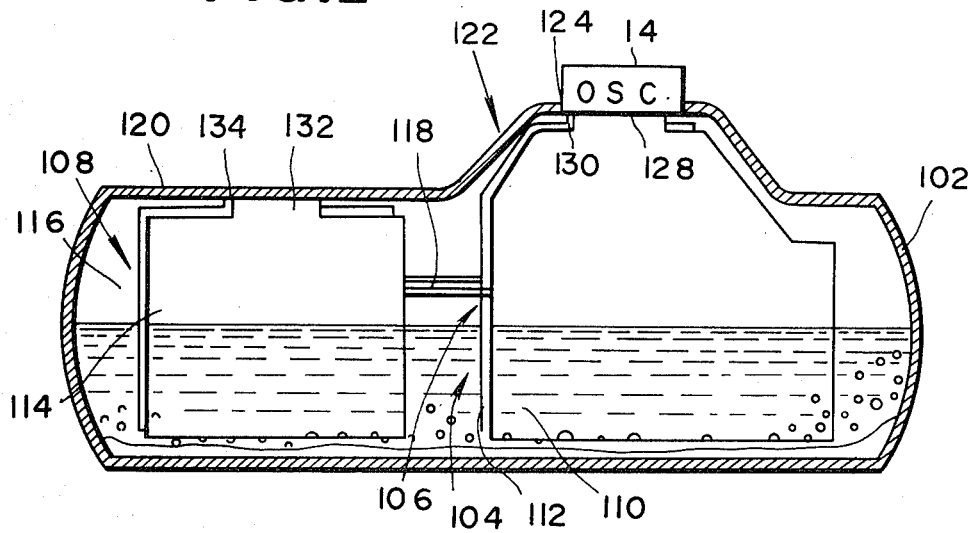
FIG. 2 is an illustrative view of a fuel level detector which is used in a fuel gauge of the embodiment of FIG. 1.
Figure 3:
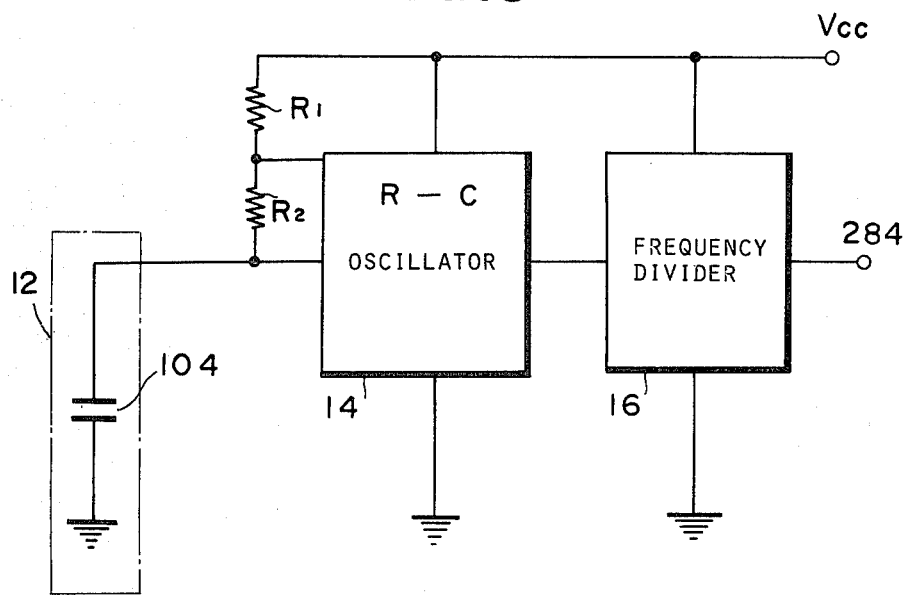
FIG. 3 is a circuit diagram of the fuel level detector shown in FIG. 2.

As shown in FIG. 2 and FIG. 3, a level sensor 12 of the fuel level detector 10 used in this embodiment has a capacitor 104 which is adapted to be inserted in a fuel tank 102. The capacitor 104 comprises a first element 106 and a second element 108. The first and second elements 106 and 108 respectively consist of pairs of symmetrical flat plates 110, 112 and 114, 116. The flat plates 110, 112 and 114, 116 of each pair function as conductive members of the capacitor. The flat plates 110,112 and 114, 116 of each pair are arranged face to face and separated by a predetermined distance by a spacer (not shown) made of an insulating material. The first and second elements 106 and 108 are electrically connected via a harness 118, that is, the flat plates 110 and 114, and 112 and 116 are connected, respectively. Accordingly, the total capacitance of the capacitor 104 corresponds to the sum of the capacitances of the first and second elements.

The top 120 of the fuel tank 102 partially protrudes so as to form a projecting portion 122 with a trapezoid profile in cross-section. The projecting portion 122 is formed with an opening 124. A casing for an oscillator 14, hereinbelow explained in detail, is housed in the opening 124 of the projecting portion 122 and fixed via a fixing means, not shown. Each of the flat plates 110, 112, 114 and 116 is formed at the top end with a projection 128, 130, 132 or 134. The plates 114 and 116 forming the second element 106 are suspended in the fuel tank 102 and are insulated from one another by means of a suspending means, not shown. The flat plates 110 and 112 forming the first element 108 are fixed to the lower surface of the oscillator casing via the projections 128, 130 so as to be insulated with respect to each other. In this manner, the flat plates 110, 112, 114 and 116 are vertically arranged with respect to the liquid surface of the fuel in the tank 102.

In the above mentioned structure, since the fuel, such as gasoline, and air have different dielectric constants, the electrical capacity of the capacitor 104 varies in accordance with the immersed area of the first and second elements 106, 108. Accordingly, the electrical capacity of the capacitor 104 changes in response to the level of fuel.

As shown in FIG. 3, the oscillator 14 is an R-C oscillator, the oscillating frequency of which in accordance with the electrostatic capacity of the capacitor 104, and which is connected to a power source $+Vcc$ via potential-dividing resistors $R_1$ and $R_2$. Thus, in this case the oscillating frequency f produced by the oscillator 14 is determined by the following equation;

$$f = \frac{1.44}{(r_1 + 2r_2) \cdot c} \rightarrow \frac{}{(r_1 + 2r_2) \cdot c}$$

wherein, $r_1$ respresents the resistance of the resistor $R_1$, $r_2$ represents the resistance of the resistor $R_2$, c represents the electrostatic capacity of the capacitor 104.

The resistance values of $R_1$ and $R_2$ are preferably so determined that the oscillating frequency varies from 5 KHz to 10 KHz when the dielectric constant $\epsilon$ of the fuel; i.e., regular gasoline, is represented by $\epsilon = 2 \times 8.85 \times 10^{-12}$ F/m. The electrostatic capacity of the capacitor 104 varies from 1000 pF to 2000 pF corresponding to the conditions from empty to full of the tank.

A frequency divider 16 divides the oscillating signal $S_3$ from the oscillator 14 into $\frac{1}{2}^6$ thereof. The output from the frequency divider 16 is input into the calculation circuit 20 as the fuel level pulse $S_1$.

The calculation circuit 20 includes first and second counters 22 and 24 which respectively count different numbers of fuel level pulses $S_1$ from the fuel level detector 10 so as to obtain the average pulse period. In this embodiment, the first counter 22 obtains the average pulse period by counting 500 pulses and outputs a counter pulse $S_4$ representing the average pulse period. On the other hand, the second counter 24 obtains the average pulse period by counting 10000 pulses and outputs a counter pulse $S_5$ representing the average period.

A switching circuit 28 is disposed between the first and second counters 22 and 24, and the frequency divider 16. The switching circuit 28 comprises a switching signal generator 282 which generates a switching signal $S_6$ in accordance with the vehicle speed signal $S_2$ from the vehicle speed sensor 40, and a switch 284 which connects the frequency divider 16 to the second counter 24 in response to the switching signal $S_6$, or connects the frequency divider 16 to the first counter when the switching signal $S_6$ is absent. Accordingly, when the vehicle stops, the first counter 22 determines the average pulse period based on 500 fuel level pulses $S_1$ so that the counter pulse $S_4$ representing this average pulse period is output. On the other hand, when the vehicle is running, the fuel level pulse $S_1$ output from the frequency divider 16 is input into the second counter 24 in which the average pulse period is determined by counting 10000 fuel level pulses so that the counter pulses $S_5$ are output.

The counter pulse $S_4$ or $S_5$ output from the first counter 22 or second counter 24 is input into a calculating unit 26. Since the calculating unit 2 is storing a pulse period To (10 KHz=0.1 msec) generated when the fuel tank 102 is empty, the fuel quantity in the fuel tank 102 can be obtained by the following equation;

$$Q = \frac{T - T_0}{T_0} \times N$$

wherein;
Q represents the fuel quantity (liter),
T represents the period of the counter pulse,
N represents the capacity of the fuel tank.

Then the calculation circuit 20 outputs an output signal S$_7$ having a value corresponding to the fuel quantity according to the calculated result. The output signal S$_7$ from the calculation circuit 20 is output in a form of a digital signal or analog signal in accordance with the nature of the display device 30, that is, depending on the display is a digital display system or an analog display system.

In the above mentioned embodiment, although the fuel amount is calculated on the basis of the period of pulses, it may be also calculated according to the frequency of pulse. In addition, the vehicle speed sensor 40 may be replaced by an ignition switch so that the switcing signal may be generated by actuating the switching signal generator 282 in response to the "on" position of the ignition switch.

Figure 4:
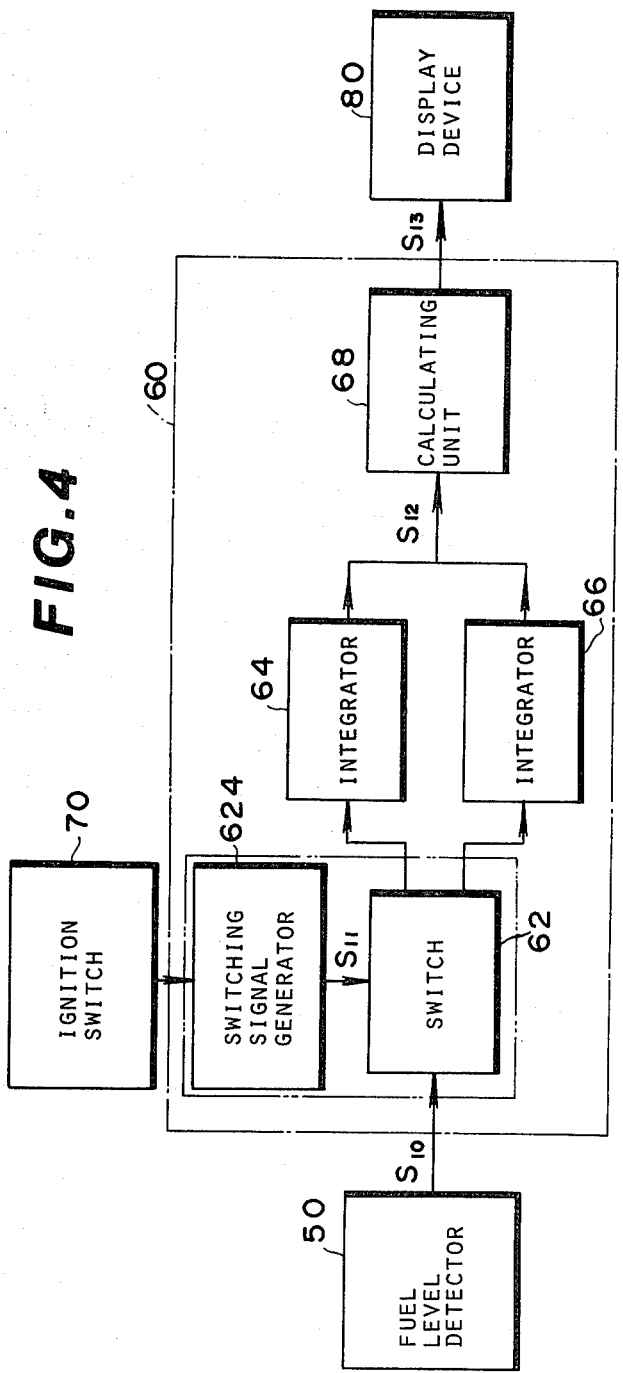
FIG. 4 is a block diagram of another embodiment of fuel gauge according to the present invention.

FIG. 4 shows another embodiment of the present invention, in which the electrostatic-type fuel level detector is replaced by a fuel level detector 50 including a well-known float-type sliding resistor or winding resistor which generates an analog signal indicative of the fuel level. In this well-known fuel level detector 50, a brush moves along the sliding resistor or the winding resistor in accordance with the float level position so that the analog value of the detected signal S$_{10}$ varies in accordance with the resistance value which varies according to the movement of the brush. The detected signal S$_{10}$ from the fuel level detector 50 is input to either a first integrator 64 or a second integrator via a switch 622 of a switching circuit 62 in a calculation circuit 60. The first and second integrators 64, 66 are provided with different time constants. The time constant of the first integrator 64 is chosen to be shorter than that of the second integrator. In this embodiment, the time constant of the first integrator 64 is chosen to be 4 to 6 seconds, and the second integrator 66, 60 to 90 seconds.

The switch 622 is connected to a switching signal generator 624 which generates a switching signal S$_{11}$ while an ignition switch 70 is turned on so that the input of the switching signal S$_{11}$ connects the second integrator 66 and the fuel level detector 50. When the switching signal is not generated, the first integrator 64 is connected to the fuel level detector 50. The integrator 64 or 66 calculates the average of the detected values within the period of each respective time constant and the result is output to a calculating unit 68 as an analog signal S$_{12}$. The calculating unit 68 calculates the fuel quantity according to the analog signals S$_{12}$ and outputs an output signal S$_{13}$ corresponding to the calculated result to a display device 80.

Figure 5:
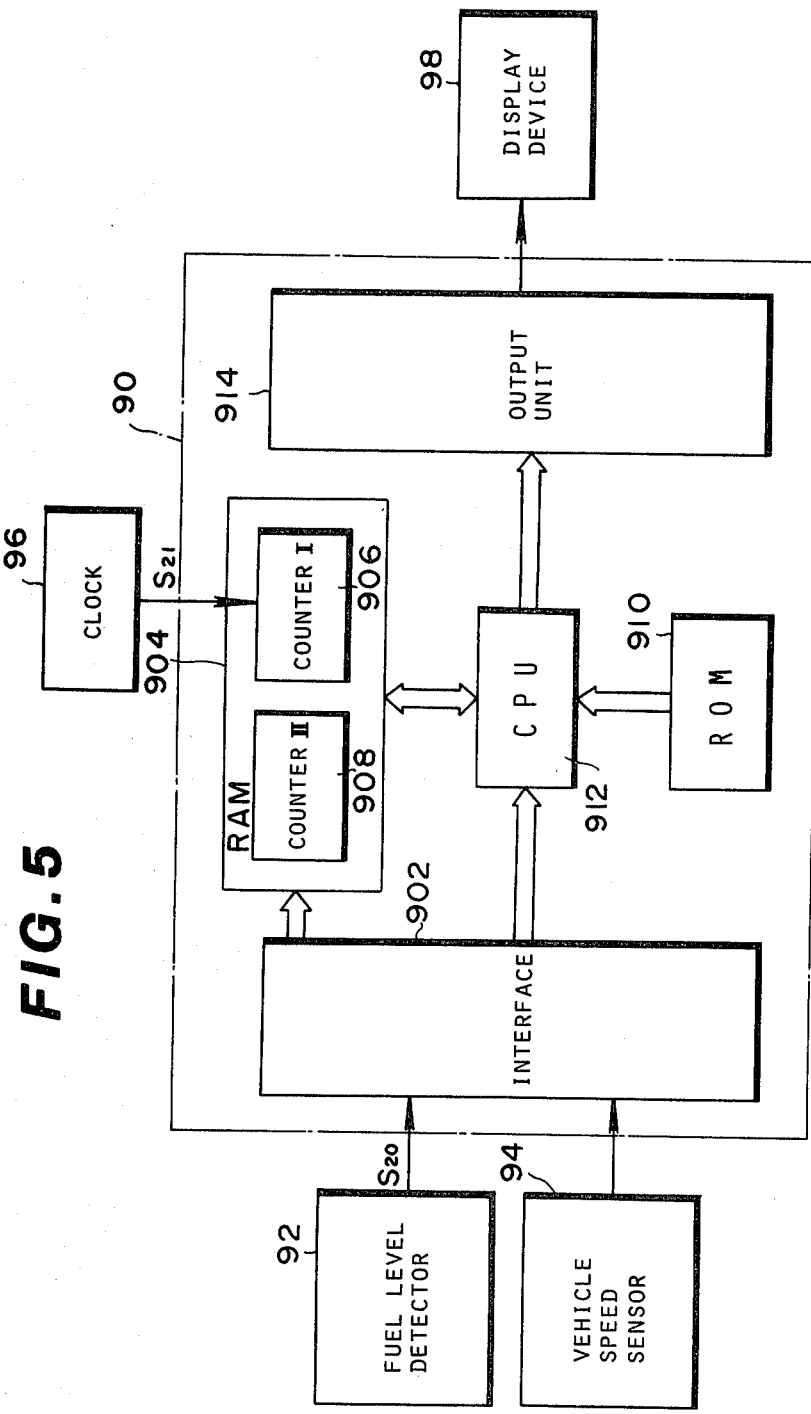
FIG. 5 is a block diagram of an other embodiment of fuel gauge according to the present invention.

FIG. 5 show another embodiment according to the present invention, in which the calculation circuit is composed of a microcomputer 90. A fuel level detector 92 outputs a fuel level pulse S$_{20}$ to an interface 902 of the microcomputer 90. In addition, the interface 902 is connected to a vehicle speed sensor 94. RAM 904 of the microcomputer 90 is connected to a clock generator 96 which generates a clock signal S$_{21}$ and includes a counter I 906 for counting the clock signal pulses S$_{21}$ and a counter II 908 for counting the fuel level pulses S$_{20}$ input via the interface 902. ROM 910 stores the following equations in order calculate an average pulse period T of a predetermined number of fuel level pulses according to the counted values of the counter I 906 and counter II 908 calculate the fuel amount according to the average pulse period T respectively $$T = \frac{\text{counter I}}{\text{counter II}} \text{ and } Q = \frac{T - T_0}{T_0} \times N,$$

where T$_0$ represents the pulse period in the case that the fuel tank is empty.

CPU 912 calculates the fuel quantity in the fuel tank in accordance with the programs stored in ROM 910, and outputs the calculated result to a display device 98 via an output unit 914.

Figure 6:
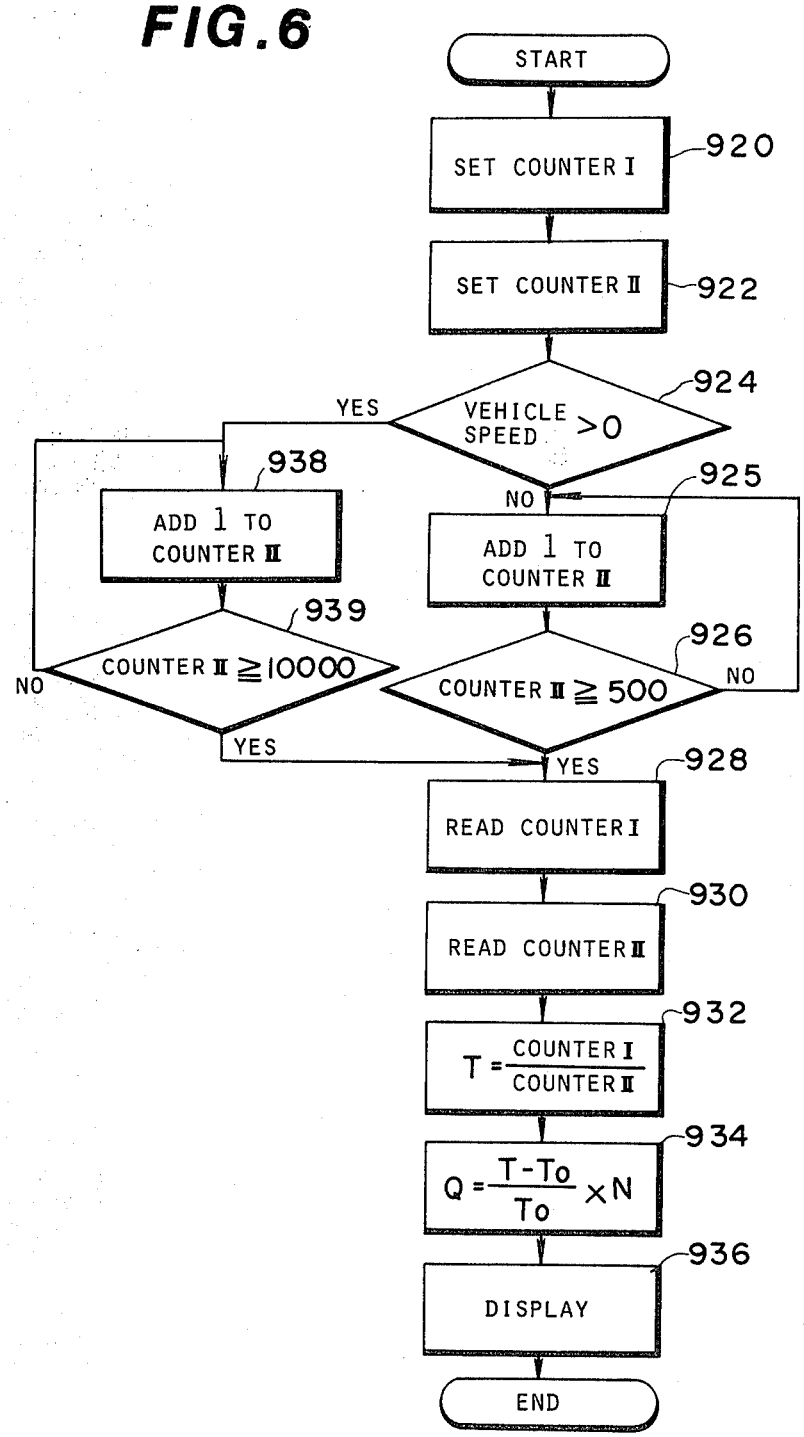
FIG. 6 is a flow chart of the fuel gauge shown in FIG. 5.

FIG. 6 is a flow chart of the operation of the microcomputer 90 in FIG. 5, and the program is carried out continuously or at a predetermined timing. After the program starts, the counter I 906 and the counter II 908 are set at the blocks 920 and 922, respectively. Then, the presence or absence of the sensor signal S$_{22}$ from the vehicle speed sensor 94 is checked at the block 924. If the sensor signal S$_{22}$ from the vehicle speed sensor 94 is absent; that is, the vehicle speed is zero, "1" is added to the counter II 908 in synchronism with the fuel level pulse S$_{20}$ at the block 925, and then the counted value of the counter II 908 is checked as to whether or not the value coincides with 500 at the block 926. The blocks 924 and 926 are repeated until the counted value of the counter II 908 coincides with this value so that 500 fuel level pulses S$_{20}$ are counted. Concurrently, the counter I 906 is continuously counting the clock signal pulses S$_{21}$. When the counted values coincides with 500 at block 926, the counted values from the counter I and the counter II are read out at the blocks 928 and 930. Then the average pulse period T is calculated according to the equation $$T = \frac{\text{counter I}}{\text{counter II}}$$

at the block 932. According to the calculated result from the block 932, $$Q = \frac{T - T_0}{T_0} \times N$$

is calculated at the block 934 and the output unit outputs the resultant value to the display device 98 at the block 936.

On the other hand, if the sensor signal S$_{22}$ from the vehicle speed sensor 94 is present at block 924, that is, if the vehicle is running at a non-zero speed, the block 938 and the block 940 are repeated. Thus, "1" is added to the counter II in synchronism with the fuel level pulse S$_{20}$ at the block 938. When the counted value of the counter II coincides with 10,000, the processes at the block 928 et seq. are carried out so as to display the fuel amount on the display device.

As given in the explanation above according to the present invention, the response to variation of fuel quantity, particularly the response to variation of the fuel quantity while the vehicle is stopped, can be improved by varying the timing of the fuel quantity calculations in accordance with the automotive vehicle driving condition.

What is claimed is:

1. A fuel gauge for an automotive vehicle comprising;
   first means for generating a first signal, the value of which varies in response to the fuel level in a fuel tank;
   second means for generating a second signal, the value of which is the average of the value of the above mentioned first signal over a first predetermined length of time;
   third means for generating a third signal, the value of which is the average of the value of the above mentioned first signal over a second predetermined length of time;
   fourth means for actuating alternatively the above mentioned second or third means in accordance with the vehicle driving condition so as to allow the actuated means to output the corresponding one of said second and third signals; and
   fifth means for calculating a fuel quantity according to the value of the outputted one of said the second and third signals and displaying the calculated result.

2. The fuel gauge according to claim 1, wherein the above mentioned first predetermined length of time is significantly shorter than the above mentioned second predetermined length of time.

3. The fuel gauge according to claim 2, wherein the above mentioned fourth means includes a vehicle speed sensor and actuates the above mentioned second means when the sensor does not generate an output, or the above mentioned third means when the sensor generates an output.

4. The fuel gauge according to claim 2, wherein the above mentioned fourth means includes an ignition switch and actuates the above mentioned second means when the ignition switch is turned off, or the above mentioned third means when the ignition switch is turned on.

5. An automotive vehicle characterized by comprising;
   a fuel level detecting means for generating a detected fuel-level signal corresponding to a fuel level;
   an averaging circuit having different selectable averaging times for averaging the detected signal output from the detecting means;
   a condition discriminating means for discriminating the vehicle condition;
   a switching means for switching the averaging time of the above mentioned averaging circuit in accordance with the condition signal output from the condition discriminating means;
   a calculating means for calculating a fuel quantity according to the detected signal averaged by the above mentioned averaging circuit; and
   a display device for displaying the fuel amount output from the calculating means.

6. The fuel gauge according to claim 5, wherein the above mentioned condition discriminating means comprises a vehicle speed sensor, and a switching signal generating means for outputting different condition signals in accordance with the vehicle speed signal from the vehicle speed sensor.

7. The fuel gauge according to claim 5, wherein the above mentioned condition discriminating means comprises an ignition switch and a switching signal generating means for outputting a different condition signal according to whether the switching position of the ignition switch is the "on" position or the "off" position.

8. The fuel gauge according to claim 5, 6 or 7, wherein the above mentioned detected signal is a pulse signal and the above mentioned averaging circuit averages the periods of different numbers of pulse signals and outputs a pulse signal indicative of the averaged pulse period.

9. The fuel gauge according to claim 5, 6 or 7, wherein the above mentioned detected signal is a pulse signal, and the above averaging circuit counts pulse signals for different time intervals and outputs a pulse signal having a frequency corresponding to the averaged frequency within the above mentioned time interval.

10. The fuel gauge according to claim 5, 6 or 7, wherein the above mentioned detected signal is an analog signal, and the above mentioned averaging circuit averages the analog signal over different time constants and outputs a signal having the value equivalent to the averaged value.

11. A fuel gauge for an automotive vehicle comprising;
    a fuel level detecting means for generating a first signal, the value of which viries in response to the fuel quantity in a fuel tank;
    an averaging means for averaging the above mentioned first signal at a predetermined timing and generating a second signal having a value according to the averaged value;
    a timing control means for detecting vehicle driving conditions according to the variation of a preselected parameter and changing the predetermined timing of the above mentioned averaging means in accordance with the driving conditions; and
    a calculating means for calculating the fuel quantity in the fuel tank according to the second signal and displaying the calculated result.

12. The fuel gauge according to claim 11, wherein the above mentioned timing control means includes a vehicle speed sensor, and averages, in accordance with the sensed vehicle speed, the value of the first signal over a first time interval when the vehicle speed is zero or the value of the first signal over a second time interval which is longer than the first time interval when the vehicle is running at a non-zero speed.

13. The fuel gauge according to claim 11, wherein the above mentioned timing control means includes an ignition switch and averages, using "on" or "off" position of the ignition switch as a parameter, the value of the first signal over a first time interval when the ignition switch is in the "off" position or the value of the first signal over a second time interval which is longer than the first time interval when the ignition switch is in the "off" position.

14. The fuel gauge according to claim 11, 12 or 13, wherein the above mentioned first signal is a pulse signal and, the above mentioned averaging means averages different numbers of pulse signals so as to output a pulse signal representing the averaged pulse period.

15. The fuel gauge according to claim 11, 12 or 13, wherein the above mentioned first signal is a pulse signal and the above mentioned averaging means counts pulse signals for different time intervals so as to output a pulse signal having a frequency corresponding to the averaged frequency within the above mentioned time interval.

16. The fuel gauge according to claim 11, 12 or 13, wherein the above mentioned first signal is an analog signal, and the above mentioned averaging circuit averages the analog signal at different time constants so as to output a signal having a value equivalent to the averaged value.

17. A measuring method for measuring a fuel quantity comprising;
   measuring continuously a fuel level in a fuel tank;
   generating a first signal the value of which continuously varies in accordance with the measured value;
   averaging the above mentioned signal value over predetermined time intervals;
   generating a second signal corresponding to the averaged value;
   calculating a fuel amount in accordance with the value of the second signal to display the calculated fuel amount;
   discriminating vehicle driving condition according to a predetermined parameter; and
   varying the above mentioned predetermined time interval according to the discriminated conditions.

18. The method according to claim 17, wherein the above mentioned discriminating parameter for the driving condition is vehicle speed so that the average value of the first signal over a first time interval is generated as the signal value for the second signal when the vehicle speed is zero, or the averaged value of the first signal over a second time interval which is longer than the first time interval is generated as the signal value for the second signal when the vehicle is running at a non-zero speed.

19. The method according to claim 17, wherein the above mentioned discriminating parameter for the driving condition is the "on" or "off" position of the ignition switch so that the average value of the first signal over a first time interval is generated as the signal value for the second signal when the ignition switch is in "off" position, or the averaged value of the first signal over a second time interval which is longer than the first time interval is generated as the signal value for the second signal when the ignition switch is in "off" position.

* * * * *